US009565019B1

(12) United States Patent
O'Connell

(10) Patent No.: US 9,565,019 B1
(45) Date of Patent: Feb. 7, 2017

(54) SECURE AND ANONYMOUS DISTRIBUTED AUTHENTICATION

(71) Applicant: EMC Corporation, Hopkinton, MA (US)

(72) Inventor: Mark A. O'Connell, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/828,851

(22) Filed: Aug. 18, 2015

Related U.S. Application Data

(62) Division of application No. 13/630,335, filed on Sep. 28, 2012, now Pat. No. 9,154,296.

(51) Int. Cl.
H04L 9/32 (2006.01)
H04L 9/08 (2006.01)
H04L 29/06 (2006.01)

(52) U.S. Cl.
CPC ............. *H04L 9/0861* (2013.01); *H04L 63/08* (2013.01); *H04L 63/10* (2013.01)

(58) Field of Classification Search
CPC ................................ H04L 9/08; H04L 9/0894
See application file for complete search history.

(56) References Cited

U.S. PATENT DOCUMENTS

| 8,095,726 | B1 | 1/2012 | O'Connell et al. |
| 8,261,295 | B1 | 9/2012 | Risbood et al. |
| 8,307,362 | B1 | 11/2012 | Gong et al. |
| 8,352,941 | B1 | 1/2013 | Protopopov et al. |
| 8,396,989 | B2 | 3/2013 | Chaturvedi et al. |
| 8,478,936 | B1 | 7/2013 | Todd et al. |
| 8,583,915 | B1 | 11/2013 | Huang |
| 2002/0038296 | A1* | 3/2002 | Margolus .......... G06F 17/30097 |
| 2003/0158960 | A1 | 8/2003 | Engberg |
| 2004/0162787 | A1* | 8/2004 | Madison ................ G06F 21/10 705/64 |
| 2009/0002333 | A1 | 1/2009 | Maxwell et al. |

(Continued)

OTHER PUBLICATIONS

Amazon Web Services, "Amazon Simple Storage Service", Devcelper Guide API Version, Mar. 1, 2006.*

(Continued)

*Primary Examiner* — Samson Lemma
*Assistant Examiner* — Arya Golriz
(74) *Attorney, Agent, or Firm* — BainwoodHuang

(57) ABSTRACT

A method performed at a central entity includes (a) sharing a secret with a remote tenant server of one of a plurality of tenant organizations, the tenant server being configured to provide authentication services for accessing storage of the central entity, (b) receiving a storage request from a remote client device, (c) extracting an identification of the tenant organization from a core portion of the request, (d) selecting the shared secret of the identified tenant organization, (e) cryptographically combining the core portion and the shared secret to generate a preliminary signature, (f) performing a computation using the preliminary signature and a body portion of the request to generate a test signature, the body portion including the core portion and an object identifier, (g) comparing the test signature with a signature from the request, and (h) permitting the client device to access an identified object only when the comparison is positive.

20 Claims, 7 Drawing Sheets

(56) References Cited

U.S. PATENT DOCUMENTS

2010/0199042 A1    8/2010   Bates et al.
2012/0265976 A1   10/2012   Spiers et al.
2012/0297183 A1   11/2012   Mukkara et al.

OTHER PUBLICATIONS

Amazon Web Services, "Introduction to Amazon S3 with Java and REST", Nov. 8, 2007.*
Satish Nikam, "Windows Azure and Java: Working with Blob Storage", Jun. 22, 2012.*
Storage Networking Industry Association, "Information Technology—Cloud Data Management Interface (CDMI)," Version 1.0.1; Sep. 15, 2011; 227 pages.
Wikipedia, "Amazon S3," as edited on Nov. 30, 2011; downloaded on Oct. 21, 2013 from <http://en.wikipedia.org/w/index.php?title=Amazon_S3&oldid=463363297>; 4 pages.

* cited by examiner

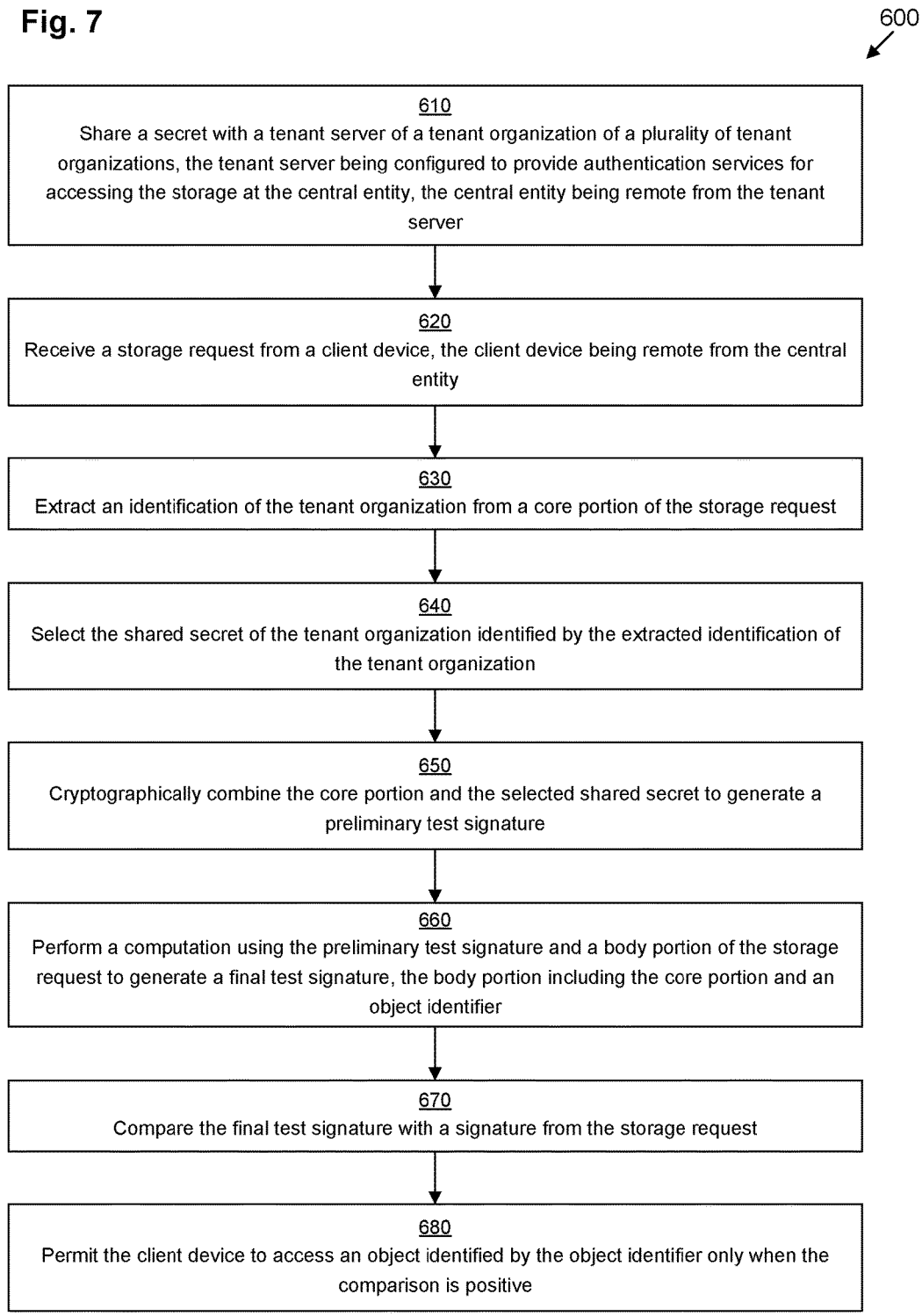

SECURE AND ANONYMOUS DISTRIBUTED AUTHENTICATION

RELATED APPLICATIONS

This Application is a Divisional of U.S. patent application Ser. No. 13/630,335, which was filed on Sep. 28, 2012.

BACKGROUND

Storage providers maintain large amounts of data storage for a multitude of users. These storage providers typically utilize authentication protocols in order to ensure that only authorized users can access the storage and that the authorized users only access portions of the storage that they are permitted to access. In order to access storage, a user may send a storage request to the storage provider signed with a signature created using a secret shared between the storage provider and that user. In order to authenticate a user for any given access attempt, the service provider verifies the identity of the user by making sure that the request is signed with the proper shared secret. The storage provider then allows access based upon an access policy for that user.

In some systems, a storage provider may rent storage space to tenant storage providers. These tenant storage providers are each responsible for initially registering each user with the storage provider. Then, a user is able to access the storage as described above.

SUMMARY

The above-described approach may not be optimal. For example, in the conventional approach, tenants are required to register user information with the storage provider. This may be undesirable if the tenant wishes to maintain the privacy of its users. In addition, the above-described registration approach may be undesirable if the tenant wants to be able to quickly add and remove users without needing to engage in a registration process with the storage provider every time a change is needed.

Thus, techniques are presented for authenticating users of tenant organizations based upon signed leases provided to the users by each tenant organization without registration with the storage provider being required for each user. Each user is able to sign its own storage requests with a temporary secret code provided by its respective tenant as part of a lease provided by the tenant to the user.

One embodiment is directed to a method of accessing remote storage of a tenant organization at a central entity that provides remote storage for a plurality of tenant organizations. The method includes (i) receiving, by a client device, a lease from a tenant server of a tenant organization of the plurality of tenant organizations, (A) the tenant server providing authentication services for accessing the remote storage at the central entity, the central entity being distinct from the tenant server, (B) the lease including (1) a core portion including lease terms and an identification of the tenant organization and (2) a first signature that cryptographically combines the core portion and a secret code associated with the tenant organization, the secret code being unknown to the client device, (ii) sending a storage request from the client device to the central entity for access to the remote storage of the tenant organization, the storage request including (a) a body portion including the core portion and an object identifier, which identifies an object stored in the remote storage and (b) a second signature that cryptographically combines the body portion and the first signature, and (iii) receiving, by the client device, a storage response from the central entity, the storage response including the object stored in the remote storage when (I) a computation performed at the direction of the central entity of a test value based on the secret code, the core portion, and the body portion matches the second signature sent in the storage request and (II) the storage request complies with the lease terms.

Another embodiment is directed to a method of providing access to storage of a central entity. The method includes (a) at a computing device of the central entity, sharing a secret with a tenant server of a tenant organization of a plurality of tenant organizations, the tenant server being configured to provide authentication services for accessing the storage at the central entity, the central entity being remote from the tenant server, (b) at the computing device of the central entity, receiving a storage request from a client device, the client device being remote from the central entity, (c) at the computing device of the central entity, extracting an identification of the tenant organization from a core portion of the storage request, (d) at the computing device of the central entity, selecting the shared secret of the tenant organization identified by the extracted identification of the tenant organization, (e) at the computing device of the central entity, cryptographically combining the core portion and the selected shared secret to generate a preliminary test signature, (f) at the computing device of the central entity, performing a computation using the preliminary test signature and a body portion of the storage request to generate a final test signature, the body portion including the core portion and an object identifier, (g) at the computing device of the central entity, comparing the final test signature with a signature from the storage request, and (h) at the computing device of the central entity, permitting the client device to access an object identified by the object identifier only when the comparison is positive.

Other embodiments are directed to a computerized apparatus and computer program product. Some embodiments involve activity that is performed at a single location, while other embodiments involve activity that is distributed over a computerized environment (e.g., over a network).

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 7 is a flow chart depicting another example method according to various embodiments.

DETAILED DESCRIPTION

Embodiments of the invention are directed to techniques for authenticating users of tenant organizations based upon signed leases provided to the users by each tenant organization without registration with the storage provider being required for each user. Each user is able to sign its own storage requests with a temporary secret code provided by its respective tenant as part of a lease provided by the tenant to the user.

Figure 1:
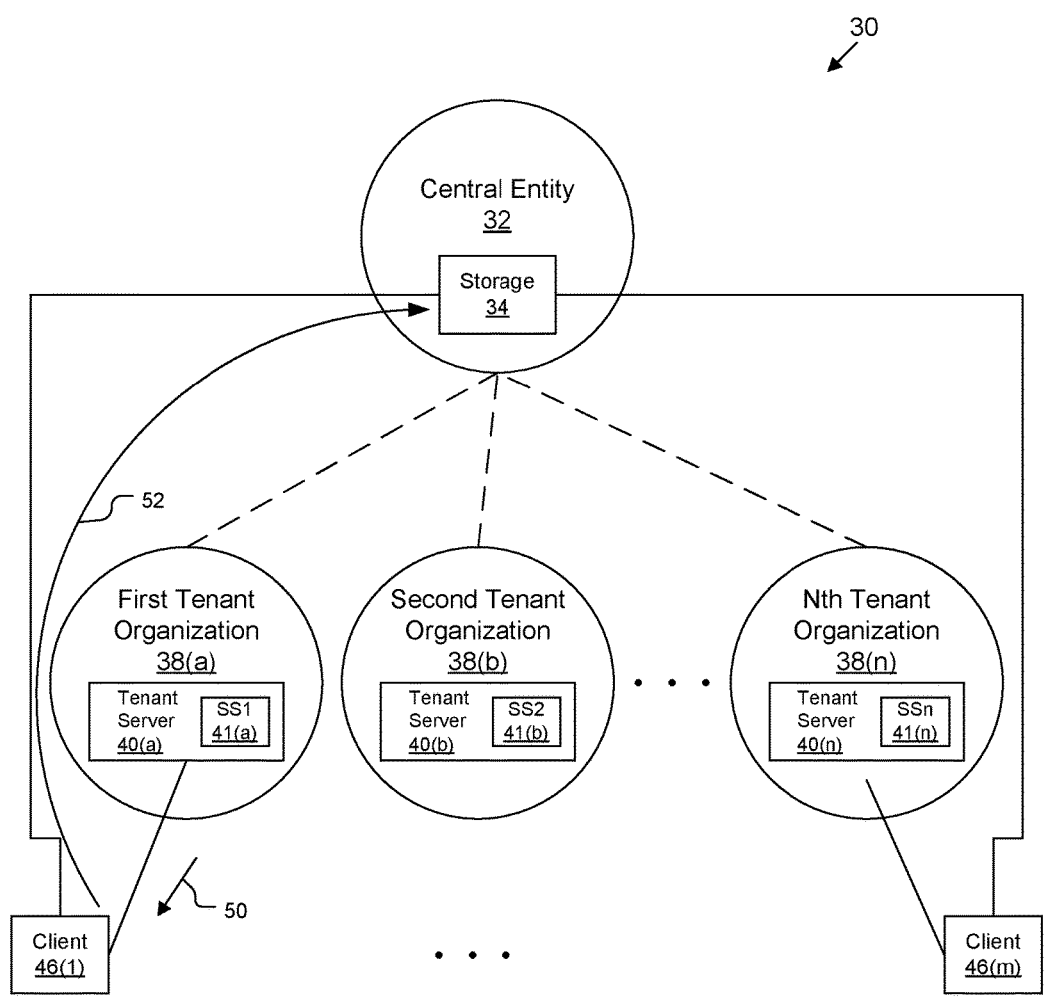
FIG. 1 is a block diagram depicting an example environment in which various embodiments may be practiced.

FIG. 1 depicts an example system 30 for use in performing various embodiments. System 30 includes a central entity 32, which provides access to storage 34 to clients 46 (depicted as clients 46(1), . . . , 46(m)) with appropriate authorization. Storage 34 may take various forms, but it is typically formed from one or more persistent storage devices, such as hard disk drives and solid state storage devices (SSDs) connected either by an internal bus or via a network (e.g., a storage area network) to a storage access control device of central entity 32 (not depicted).

A plurality of tenant organizations 38 (depicted as first tenant organization 38(a), second tenant organization 38(b), . . . , n-th tenant organization 38(n)) lease storage space from the central entity 32, which they each are able to sub-lease to their respective clients 46. Each tenant organization 38 includes a tenant server 40 (depicted as tenant servers 40(a), 40(b), . . . , 40(n)) which is responsible for providing leases 50 to clients 46 of its respective tenant organization 38 so that the clients 46 are able to access the storage 34 via storage requests 52 when authorized.

Each tenant server 40 stores a shared secret 41 (depicted as SS1 41(a), SS2 41(b), . . . , SSn 41(n)) that is shared between that tenant server 40(x) and the central entity 32. The dotted lines between the tenant organizations 38 and the central entity 32 indicate a logical relationship—the tenant organizations 38 lease storage space of the storage 34 from central entity 32 and each shares a respective secret 41 with the central entity.

In some embodiments, central entity 32 is a large data center having dozens or hundreds of banks of individual storage systems (e.g., Symmetrix® or VNX® series storage systems produced by the EMC Corporation of Hopkinton, Mass.) storing petabytes or exabytes of data making up storage 34 attached to one or more computing devices 200 configured to control access to storage 34. Tenant organizations 38 may be individual websites or cloud storage providers that provide access or cloud-based storage to users running clients 46(a). Thus, for example, a user of client 46(1) may have a cloud-storage account with "Clouds Are Us," a hypothetical cloud-based storage provider taking the place of first tenant organization 38(a). However, "Clouds Are Us" does not actually provide any of its cloud-based storage itself—rather, it outsources the storage to the data center of central entity 32 and it operates a tenant server 40(a) to provide leases 50 to its users. Thus, an individual who is a user of "Clouds Are Us" is able to access his cloud-based storage by using his client device 46(a) to obtain a lease 50 from tenant server 40(a) (typically over the Internet, not depicted), which it is then able to use to construct a storage request 52, which it then sends to central entity 32 for processing (typically over the Internet, not depicted).

In some embodiments, the central entity 32 may allow data access over an HTTP/REST based protocol, with a cryptographically generated signature used to guarantee the authenticity of the data request and to authorize the data access. In such embodiments, the client 46 would send a properly formatted HTTP packet to the central entity 32. The HTTP packet would include lease information, a cryptographically generated signature, data access request information, and any other necessary information required by the central entity 32. The individual elements may be distinguished by an appropriate use of HTTP headers, an XML document in the HTTP request body, a JSON document in the http request body, or any other such mechanism that the central entity 32 may be configured to accept. The invention is not restricted to HTTP/REST based protocols, and it should be clear to one of normal skill in the art that this same information may be communicated between the client and the central entity over a variety of network transport protocols.

Figure 2:
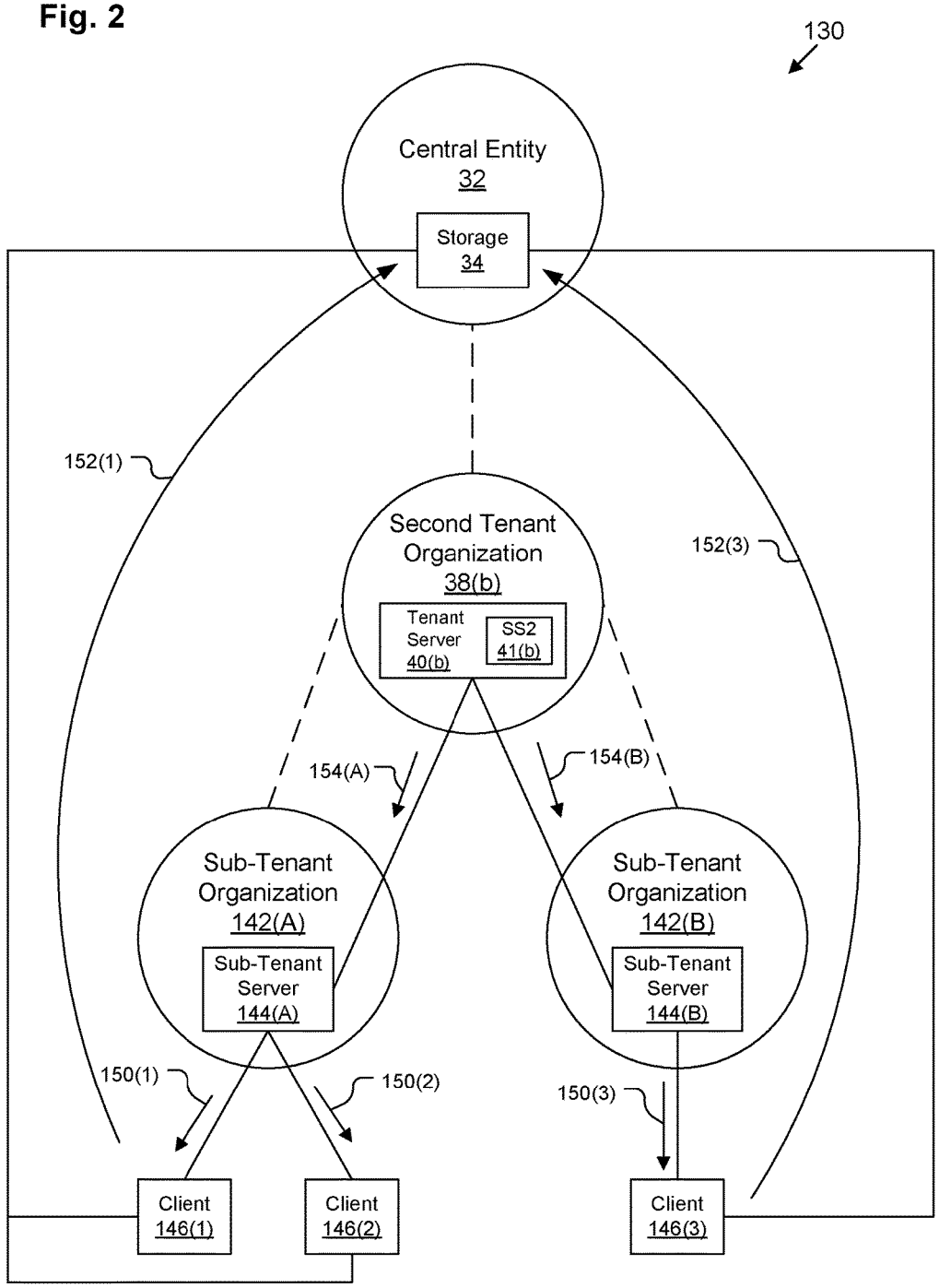
FIG. 2 is a block diagram depicting another example environment in which various embodiments may be practiced.

In some embodiments an enhanced system 130 is used, as depicted in FIG. 2. In example enhanced system 130, instead of tenant organizations 38 directly sub-leasing space to their clients 146 (depicted as clients 146(1), 146(2), . . . , 146(3)), tenant organizations 38 (of which, only one, the second tenant organization 38(b), is shown) sub-lease to sub-tenant organizations 142 (depicted as sub-tenant organizations 142 (A), . . . , 142(B)), which in turn sub-sub-lease space to clients 146. The dotted lines between the tenant organizations 38 and the central entity 32 indicate a logical relationship—the tenant organizations 38 lease storage space of the storage 34 from central entity 32 and each shares a respective secret 41 with the central entity—while the dotted lines between the second tenant organization 38(b) and the sub-tenant organizations 142 also indicate a logical relationship—the sub-tenant organizations 142 sub-lease storage space of the storage 34 that second tenant organization 38(b) leases from central entity 32 and each sub-tenant organizations 142 receives a respective lease (or upper lease) 154 from second tenant organization 38(b). Each sub-tenant organization 142 is then able to provide a sub-lease (also referred to as a "lease") 150 to its respective clients 146.

For example, in system 130, central entity 32 may be a large data center having dozens or hundreds of banks of individual storage systems (e.g., Symmetrix or VNX series storage systems produced by the EMC Corp.) storing petabytes or exabytes of data making up storage 34 attached to one or more storage access control devices of central entity 32 configured to control access to storage 34. Second tenant organization 38(b) may be, for example, a large international law firm which provides cloud-based storage to its employees running clients 146. However, the large international law firm does not actually provide any of its cloud-based storage itself—rather, it outsources the storage to the data center of central entity 32. However, since the large international law firm may have tens of thousands of employees in hundreds of branch offices around the world, each of which is managed separately, the large international law firm may sub-lease its cloud-storage space to each of its local branch offices, each of which is a separate sub-tenant organization 142. Each local branch office runs a respective sub-tenant server 144, and is thus able to manage the cloud access of each of its own employees. Thus, the Boston office of the large international law firm may be sub-tenant organization 142(A) running sub-tenant server 144(A), while the Hong Kong office of the large international law firm may be sub-tenant organization 142(B) running sub-tenant server 144(B). The sub-tenant server 144(A) of the Boston office obtains a lease 154(A) from the tenant server 40(b) of the large international law firm signed with shared secret SS2

41(*b*). The Boston office is then able to provide leases 150(1), 150(2) to its local Boston employees running client devices 146(1), 146(2) using its own lease 154(A) for signature purposes. Meanwhile, the sub-tenant server 144 (B) of the Hong Kong office obtains a lease 154(B) from the tenant server 40(*b*) of the large international law firm signed with shared secret SS2 41(*b*). The Hong Kong office is then able to provide a lease 150(3) to one of its local Hong Kong employees running client device 146(3) using its own lease 154(B) for signature purposes.

Advantageously, because tenant organizations 38 and sub-tenant organizations 142 are able to provide their own leases 50, 150, 154, central entity 32 does not need to store and maintain information for all users and clients 46, 146 which are permitted to access storage 34. Rather, the individual storage requests 52, 152 provide enough information (gleaned from leases 50, 150, 154) to allow the central entity 32 to decide whether the individual storage requests 52, 152 should be allowed or denied.

Figure 3:
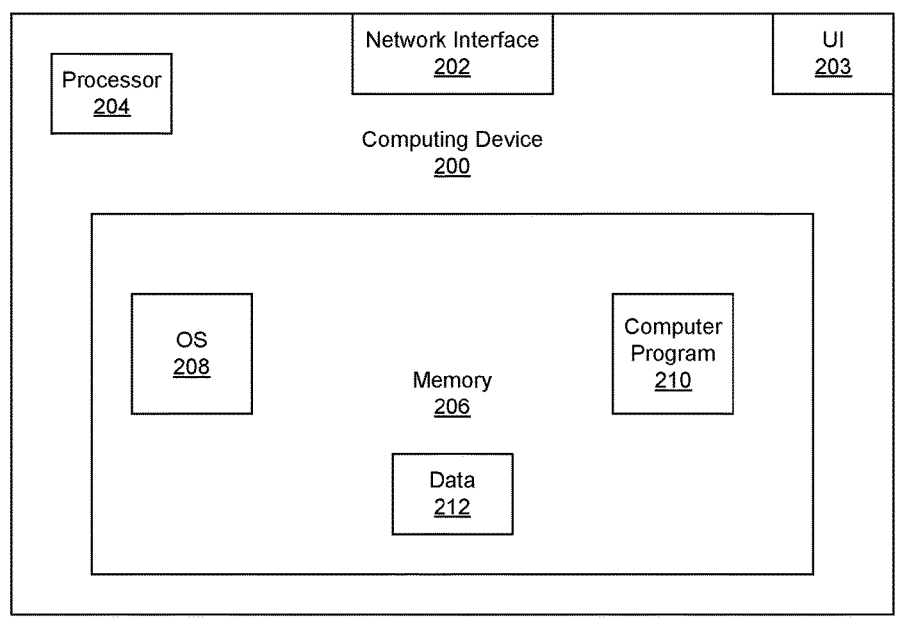
FIG. 3 is a block diagram depicting an example computing device that may be included within the example environments of FIGS. 1 and 2.

FIG. 3 depicts an example computing device 200 that may be used to implement any of the tenant server 40, sub-tenant server 144, client 46, 146, and storage access control device of central entity 32. It should be understood that such computing devices 200 need not be identical to one another, however. Computing device 200 may be any kind of computing device, such as, for example, a personal computer, a workstation, a server, an enterprise server, a laptop computer, a mobile computer, a smart phone, a tablet computer, etc. Client 26, 146 may be any of these, but tenant server 40, sub-tenant server 144, and storage access control of central entity 32 will typically be a server or enterprise server.

Computing device 200 includes a network interface 202. Each computing device 200 is able to communicate with various other computing devices 200 (as relevant for the needs of that particular computing device 200) using network interface 202. In some embodiments (particularly in the case of clients 46, 146, but also, in certain embodiments, the other devices), computing device 200 also contains a user interface (UI) 203 which allows computing device 200 to communicate with a user via UI devices (not depicted). UI 203 may be for example, one or more of the following, a graphics adapter, a serial port, a parallel port, a Universal Serial Bus adapter, etc. UI devices may include input devices as well as output devices. Example UI devices include a display monitor and a keyboard. Other example UI devices could include a printer, a touch screen, a mouse, etc.

Computing device 200 also contains a processor 204 and memory 206. Processor 204 may be any kind of processor or set of processors configured to perform operations, such as, for example, a microprocessor, a multi-core microprocessor, a digital signal processor, a collection of electronic circuits, or any combination of the above. Memory 206 may be any kind of digital memory, such as, for example, random access memory, read-only memory, static memory, volatile memory, non-volatile memory, system memory, solid-state storage, disk-based storage, or some combination of the above. Memory 206 stores programs executing on processor 204 as well as data used by those programs. Memory 206 stores an operating system 208 and a configuration program computer program 210, both of which run on processor 204. Memory 206 typically includes both a system memory portion for storing programs and data in active use by the processor 204 as well as a persistent storage portion (e.g., solid-state storage and/or disk-based storage) for storing programs and data even while the computing device 200 is powered off. OS 208 and computer program 210 are typically stored both in system memory and in persistent storage so that they may be loaded into system memory from persistent storage upon a system restart. The computer program 210, when stored in non-transient form in system memory, forms a computer program product. Memory 206 also stores data 212 which is used by computer program 210 in operation. The processor 204 running the computer program 210 thus forms a specialized circuit constructed and arranged to carry out the various processes described herein.

On a client 46, 146, computer program 210 may be a storage access program. On a storage access control computing device 200 of central entity 32, computer program 210 may be a storage access control program. On a tenant server 40 or sub-tenant server 144, computer program 210 may be a lease provisioning program configured to provide a lease to a client 46, 146 in accordance with access permissions associated with a user of such client 46, 146.

The contents of program data 212 may vary depending on what kind of computer program 210 is running on the computing device 210. When the computer program 210 is a storage access control program of central entity 32, then program data 212 may include a database associating each tenant organization 38 with a particular unique shared secret 41. The program data 212 may also include one or more received storage requests 52, 152 for processing.

When the computer program 210 is a lease provisioning program of a tenant server 40 or sub-tenant server 144, then program data 212 may include a database associating the clients 46, 146 (or users of those clients 46, 146) with specific access policies for those clients 46, 146 or users. This database may also include information which allows each client 46, 146 or user to be properly identified by the computer program 210 (e.g., a username and password, an IP address, etc.). The program data 212 may also include one or more leases 50, 150 to be sent to the clients 46, 146. In the case of a tenant server 40, the program data 212 also includes shared secret 41, while in the case of a sub-tenant server 144, the program data 212 may also include an upper lease 154 received from a tenant server 40.

When the computer program 210 is a storage access program of a client 46, 146, then program data 212 may include a lease 50, 150 received from a tenant server 40 or sub-tenant server 144 as well as one or more storage requests 52, 152 to be sent to client entity 32.

Figure 4:
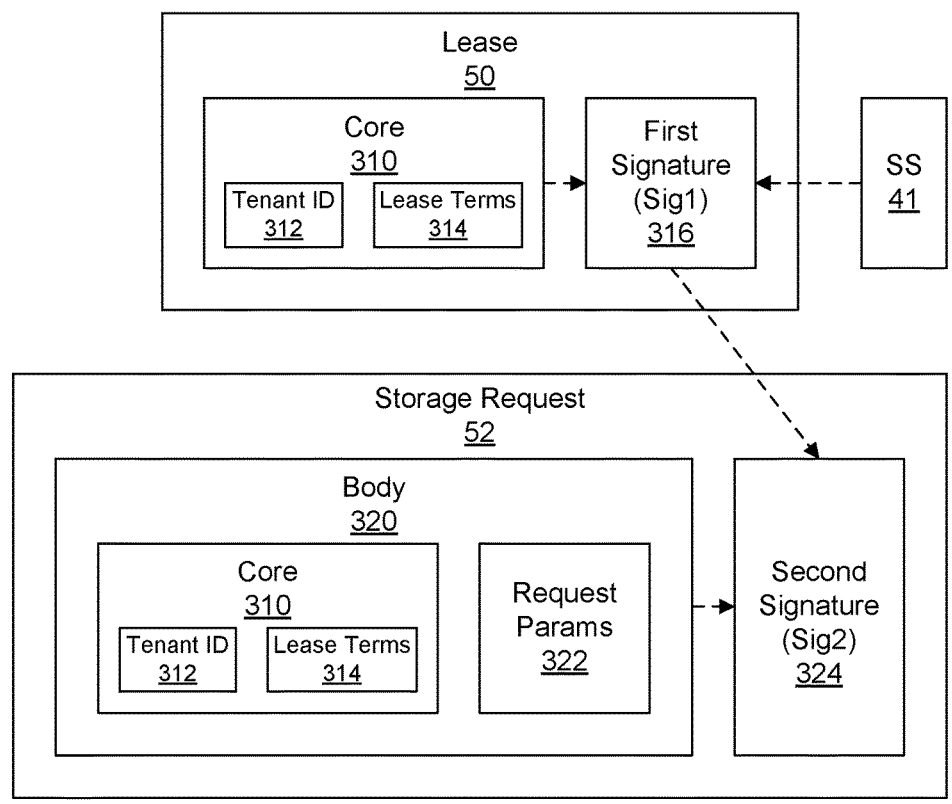
FIGS. 4 and 5 are block diagrams depicting example data structures for use in practicing various embodiments.
Figure 5:
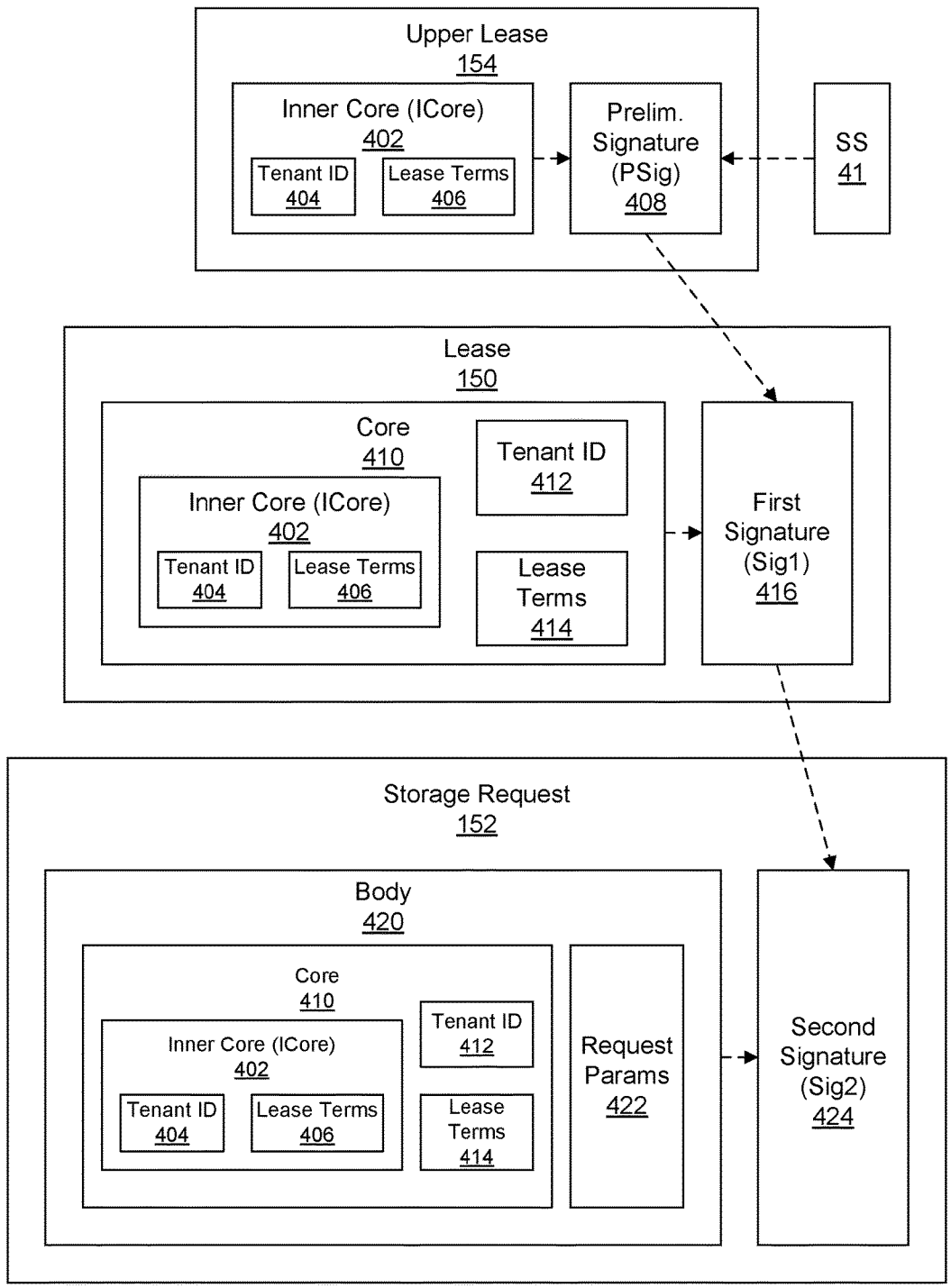

Further details with respect to the shared secret 41, leases 50, 150, upper lease 154, and storage requests 52, 152 of program data 212 are depicted in FIGS. 4 and 5.

FIG. 4 depicts certain data stored within the program data 212 of various computing devices 200 in the context of system 30, in which a client 46 receives a lease 50 from a tenant organization 38. Lease 50 includes a core portion 310 and a first signature (Sig1) 316. Lease provisioning program of tenant server 40(*a*) creates core portion 310 by including a tenant ID 312 which uniquely identifies tenant server 40(*a*) or tenant organization 38(*a*) as well as lease terms 314. Lease terms 314 define the boundaries of the lease 50 provided to the client 46. For example, lease terms 314 may include an area of storage 34 that the client 46 is permitted to access (e.g., an address range or a hierarchy of files or objects that the client 46 is permitted to access), a time period for the lease 50 (e.g., after time X and before time Y), and an identifier of the client 46. These lease terms 314 may be calculated with reference to the database associating each client 46 (or user of that client 46) with specific access policies for that client 46.

Once the core portion 310 of the lease 50 has been calculated, lease provisioning program of tenant server 40(*a*) creates the first signature (Sig1) by cryptographically combining the core portion 310 with the shared secret 41(*a*) of that tenant server 40(*a*) (e.g., using a cryptographic hashing algorithm, such as an MD5 hash). The dotted arrows pointing at first signature (Sig1) 316 indicate that the first signature (Sig1) 316 is formed by hashing or otherwise cryptographically combining the core portion 310 and the shared secret 41(*a*).

Once the storage access program of client 46 has received the lease 50, it is able to generate a storage request 52 to send to central entity 32. Storage access program creates a body portion 320 by combining the core portion 310 of the received lease 50 with request parameters 322. The request parameters 322 may include, for example, an identifier of the client 46 as well as details of what portion of storage 34 client 46 wishes to access and how it wishes to access it (e.g., to read it or to write certain data to it). If the storage 34 uses an object-based storage system, then the request parameters may include an object identifier which identifies a spot in an object hierarchy. If the storage 34 uses a file-based storage system, then the request parameters may include a file name and/or path which identifies a particular file at a particular logical location. If the storage 34 uses a block-based storage system, then the request parameters may include a range of block addresses which identify the blocks that the client 46 wishes to access.

Storage access program is then able to cryptographically combine the body portion 320 with the first signature (Sig1) 316 from the received lease 50 (e.g., using a cryptographic hashing algorithm, such as an MD5 hash) in order to create second signature (Sig2) 324, which is also included as part of the storage request 52. The dotted arrows pointing at second signature (Sig2) 324 indicate that the second signature (Sig2) 324 is formed by hashing or otherwise cryptographically combining the body portion 320 and the first signature (Sig1) 316.

FIG. 5 depicts certain data stored within the program data 212 of various computing devices 200 in the context of system 130, in which a client 146 receives a lease 150 from a sub-tenant organization 142, which, in-turn, receives an upper lease 154 from a tenant organization 38.

Upper lease 154 includes an inner core portion (ICore) 402 and a preliminary signature (PSig) 408. Lease provisioning program of tenant server 40(*b*) creates inner core portion (ICore) 402 by including a tenant ID 404 which uniquely identifies tenant server 40(*b*) or tenant organization 38(*b*) as well as lease terms 406. Lease terms 406 define the boundaries of the lease 154 provided to the sub-tenant organization 142 (e.g., sub-tenant organization 142(A)). For example, lease terms 406 may include an area of storage 34 that the sub-tenant organization 142(A) is permitted to sub-lease to clients 146 (e.g., an address range or a hierarchy of files or objects that the client 46 is permitted to access), a time period for the upper lease 154 (e.g., after time X and before time Y), and an identifier of the client 146. These lease terms 406 may be calculated with reference to the database associating each client 146 (or user of that client 146) with specific access policies for that client 146.

Once the inner core portion (ICore) 402 of the upper lease 154 has been calculated, lease provisioning program of tenant server 40(*b*) creates the preliminary signature (PSig) 408 by cryptographically combining the inner core portion (ICore) 402 with the shared secret 41(*b*) of that tenant server 40(*b*) (e.g., using a cryptographic hashing algorithm, such as an MD5 hash). The dotted arrows pointing at preliminary signature (PSig) 408 indicate that the preliminary signature (PSig) 408 is formed by hashing or otherwise cryptographically combining the inner core portion (ICore) 402 and the shared secret 41(*b*).

Once sub-tenant server 144(A) has received the upper lease 154 from the tenant server 40(*b*), lease provisioning program of sub-tenant server 144(A) creates a lease 150 for a client 146 (e.g., client 146(1)). Lease 150 includes a core portion 410 and a first signature (Sig1) 416. Lease provisioning program of sub-tenant server 144(A) creates core portion 410 by combining the inner core portion (ICore) 402 of the received upper lease 154 with a tenant ID 412 which uniquely identifies sub-tenant server 144(A) or sub-tenant organization 142(A) as well as lease terms 414. Lease terms 414 define the boundaries of the lease 150 provided to the client 146. For example, lease terms 414 may include an area of storage 34 that the client 146 is permitted to access (e.g., an address range or a hierarchy of files or objects that the client 146 is permitted to access), a time period for the lease (e.g., after time X and before time Y), and an identifier of the client 146. These lease terms 414 may be calculated with reference to the database associating each client 146 (or user of that client 146) with specific access policies for that client 146.

Once the core portion 410 of the lease 150 has been calculated, lease provisioning program of sub-tenant server 144(A) creates the first signature (Sig1) 416 by cryptographically combining the core portion 410 with the preliminary signature (PSig) 416 received from tenant server 40(*b*) (e.g., using a cryptographic hashing algorithm, such as an MD5 hash). The dotted arrows pointing at first signature (Sig1) 416 indicate that the first signature (Sig1) 416 is formed by hashing or otherwise cryptographically combining the core portion 410 and the preliminary signature (PSig) 416.

Once the storage access program of client 146 has received the lease 150, it is able to generate a storage request 152 to send to central entity 32. Storage access program creates a body portion 420 by combining the core portion 410 of the received lease 150 with request parameters 422. The request parameters 422 may include, for example, an identifier of the client 146 as well as details of what portion of storage 34 client 146 wishes to access and how it wishes to access it (e.g., to read it or to write certain data to it). If the storage 34 uses an object-based storage system, then the request parameters may include an object identifier which identifies a spot in an object hierarchy. If the storage 34 uses a file-based storage system, then the request parameters may include a file name and/or path which identifies a particular file at a particular logical location. If the storage 34 uses a block-based storage system, then the request parameters may include a range of block addresses which identify the blocks that the client 146 wishes to access.

Storage access program is then able to cryptographically combine the body portion 420 with the first signature (Sig1) 416 from the received lease 150 (e.g., using a cryptographic hashing algorithm, such as an MD5 hash) in order to create second signature (Sig2) 424, which is also included as part of the storage request 152. The dotted arrows pointing at second signature (Sig2) 424 indicate that the second signature (Sig2) 424 is formed by hashing or otherwise cryptographically combining the body portion 420 and the first signature (Sig1) 416.

Figure 6:
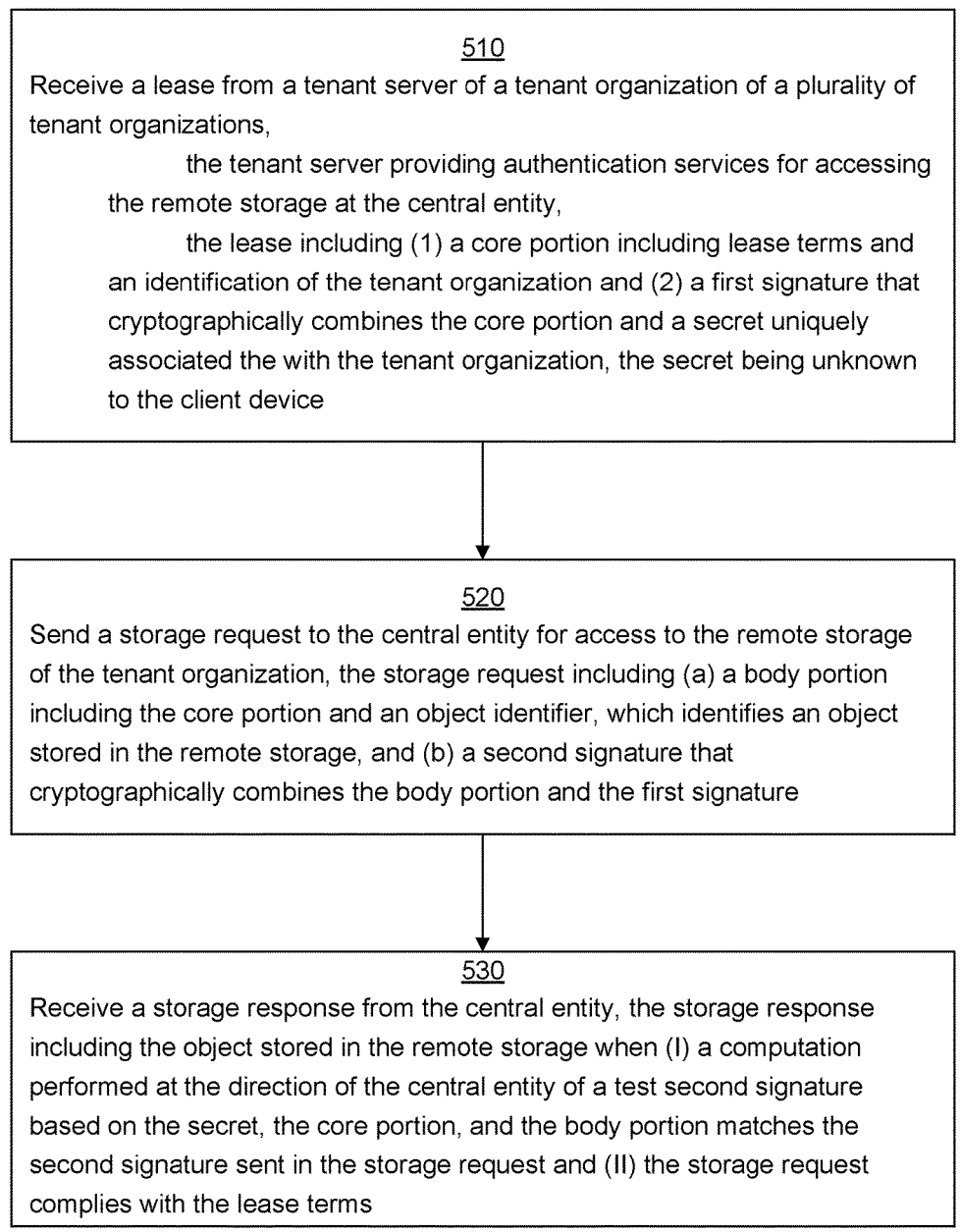
FIG. 6 is a flow chart depicting an example method according to various embodiments.

FIG. 6 illustrates the operation of systems 30, 130 in detail according to various embodiments. It should be understood that any time a piece of software, such as, for example, computer program 210, storage access program, lease provisioning program, or storage access control program is described as performing a method, process, step, or function, in actuality what is meant is that the computing device 200 on which that piece of software is running performs the method, process, step, or function when executing that piece of software on processor 204.

FIG. 6 illustrates, as method 500, the operation of storage access program (which takes the form of computer program 210) of client 46, 146 once the client 46, 146 has requested a lease 50, 150 from the tenant server 40 or sub-tenant server 144 of the tenant organization 38 or sub-tenant organization 142 that has leased storage space to that client 46, 146.

In step 510, storage access program of client 46, 146 receives a lease 50, 150 from a tenant server (e.g., a tenant server 40 or a sub-tenant server 144) of a tenant organization (e.g., a tenant organization 38 or a sub-tenant organization 142), via network interface 202. The lease 50, 150 includes a core portion 310, 410 and a first signature (Sig1) 316, 416. The core portion 310, 410 includes lease terms 314, 414 and a tenant ID 312, 412. The first signature (Sig1) 316, 416 is a cryptographic hash of the core portion 310, 410 and a secret code associated with the tenant organization and unknown to the client 46, 146. In the case in which the lease 50 is received from a tenant server 40, the secret code is a shared secret 41 uniquely shared between the central entity 32 and the tenant organization 38. In the case in which the lease 150 is received from a sub-tenant server 144, the secret code is the preliminary signature (PSig) 408 stored within the upper lease 154 that the sub-tenant server 144 has received from a tenant server 40. In the case in which the lease 150 is received from a sub-tenant server 144, the core portion 410 also includes an inner core (ICore) 402 also stored within the upper lease 154 that the sub-tenant server 144 has received from a tenant server 40.

In step 510, storage access program of client 46, 146 creates and sends a storage request 52, 152 to the central entity 32 for access to the remote storage 34 provisioned by the tenant organization 38 or sub-tenant organization 142. The storage access program of client 46, 146 creates the storage request 52, 152 by forming a body portion 310, 410 from the core portion 310, 410 from the received lease 50, 150 and combining the body portion 320, 420 with request parameters 322, 422 (discussed above in connection with FIGS. 4 and 5). The storage access program of client 46, 146 continues to create the storage request 52, 152 by forming a second signature (Sig2) 324, 424 by cryptographically hashing the newly-formed body portion 310, 410 with the first signature (Sig1) 316, 416 from the received lease 50, 150. Once the storage request 52, 152 has been created, the storage access program of client 46, 146 sends it to the central entity 32 via network interface 202.

After storage access program of client 46, 146 has performed steps 510 and 520, the central entity 32 performs a method to determine whether the storage request 52, 152 is to be accepted or denied (see, e.g., steps 620-680 of method 600, described below in connection with FIG. 7).

In step 530, storage access program of client 46, 146 receives a storage response from the central entity 32. The storage response includes the requested object from storage 34 (or, in the case of a write operation, a confirmation that the requested data has been written to the address or area indicated by the request parameters 322, 422) when the central entity 32 (or, more precisely, when a storage access control computing device 200 of central entity 32, running a storage access control program) has (I) confirmed that the second signature (Sig2) 324, 424 in the storage request 52, 152 is consistent with the body portion 320, 420 and core portion 310, 410 within the storage request given that the central entity 32 is aware of the shared secret 41 used in performing such calculations and (II) confirmed that the request parameters 322, 422 comply with the lease terms 314, 414 (and, in embodiments in which a sub-tenant organization 144 is involved, that the request parameters 422 comply with the lease terms 406 of the inner core 402). In some embodiments, rather than the central entity 32 performing these confirmation calculations directly, central entity 32 may direct another device to perform these calculations on its behalf.

FIG. 7 illustrates, as method 600, the operation of storage access control program (which takes the form of computer program 210) of the storage access control device of the central entity 32.

In step 610, storage access control program of central entity 32 shares a secret 41 with a remote tenant server 40(x) of a tenant organization 38(x) of the plurality of tenant organizations 38. That tenant server 40(x) is configured to provide authentication services for accessing the storage 34 of the central entity 32. In some embodiments, that tenant server 40(x) is only authorized to allow access to a portion of the remote storage 34 smaller than the whole of the remote storage 34. Thus, for example, the various different tenant servers 40(a)-40(n) may each be authorized to access distinct (and, in some cases, non-overlapping) portions of the remote storage 34.

Step 620 is performed only once a client device 46, 146 has created and sent a storage request 52, 152 to the central entity (e.g., after performing method 500 described above in connection with FIG. 6). In step 620, storage access control program of central entity 32 receives the storage request 52, 152 from remote client device 46, 146 via network interface 202.

In step 630, storage access control program of central entity 32 extracts a tenant identifier from a core portion of the storage request 52, 152. In the case of a storage request 52, the tenant ID 312 of the core 310 is extracted. In the case of a storage request 152, the tenant ID 404 of the inner core (ICore) 402 is extracted. Either way, the tenant organization 38(x) is identified (and not a sub-tenant organization 142).

In step 640, storage access control program of central entity 32 selects the shared secret 41(x) of the tenant organization 38(x) identified by the extracted tenant ID 312, 404.

In step 650, storage access control program of central entity 32 cryptographically combines the core portion (either core portion 310 or ICore 402) and the selected shared secret 41(x) to generate a preliminary test signature. In the case of a storage request 52, the core portion 310 is cryptographically combined with the selected shared secret 41(x) to yield a test version of Sig1 316 (hereinafter referred to as Sig1'). In the case of a storage request 152, the ICore 402 is cryptographically combined with the selected shared secret 41(x) to yield a test version of PSig 408 (hereinafter referred to as PSig'). In step 660, storage access control program of central entity 32 performs a computation using the preliminary test signature Sig1', PSig' and a body portion 320, 420 of the storage request 52, 152 to generate a final test signature (hereinafter referred to as Sig2'). In the case of a storage request 52, this computation is done by cryptographically combining the body portion 320 with Sig1' to yield a test version of the second signature (Sig2) 324, which we call Sig2'. In the case of a storage request 152, this computation is done by first cryptographically combining the core portion 410 with PSig' to generate a an intermediate test signature Sig1'—a test version of the first signature (Sig1) 424. Then, the computation continues by cryptographically combining the body portion 420 with intermediate signature Sig1' to yield a test version of the second signature (Sig2) 424, which we call Sig2'.

In step 670, storage access control program of central entity 32 compares the calculated final test signature Sig2' with the second signature (Sig2) 324, 424 from the storage request 52, 152.

In step 680, storage access control program of central entity 32 permits the client 46, 146 to access the storage 34 only when the comparison of step 670 was positive (Sig2=Sig2'). A successful comparison indicates that the client 46, 146 was truly in possession of the lease 50, 150 (and in the case of storage request 152 that the sub-tenant server was truly in possession of the upper lease 154) and that the lease 50, 150 was generated by an authorized tenant server 40 or sub-tenant server 144 and that the storage request 52, 152 has not been tampered with since leaving the client 46, 146. Otherwise, access is denied.

In addition, storage access control program of central entity 32 may also conduct additional tests in deciding whether to allow access. Thus, in some embodiments, storage access control program of central entity 32 checks to make sure that the lease terms 314, 414 (e.g., area of storage are within proper parameters, current time is within time period of the lease terms 314, 414) are satisfied. Otherwise, access is denied. In some embodiments, in the case of a storage request 152, storage access control program of central entity 32 also checks to make sure that the lease terms 406 of the upper lease 154 (e.g., area of storage are within proper parameters, current time is within time period of the lease terms 406) are satisfied. Otherwise, access is denied.

Thus, techniques have been described for authenticating users 46, 146 of tenant organizations 38, 142 based upon signed leases 50, 150, 154 provided to the users 46, 146 by each tenant organization 38, 142 without registration with the storage provider 32 being required for each user 46, 146. Each user 46, 146 is able to sign its own storage requests 52, 152 with a temporary secret code provided by its respective tenant 38, 142 as part of a lease 50, 150 provided by the tenant 38, 142 to the user 46, 146.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although embodiments have been described in which (a) a tenant server 40 sends lease 50 to client 46 and (b) a sub-tenant server 144 sends lease 150 to client 146 after having received an upper lease 154 from a tenant server 40, further nesting is possible. Thus, embodiments are conceived in which a sub-tenant of a sub-tenant server 144 is also a form of tenant server that may grant a lease to a client, and other embodiments having even more layers. Similar techniques may be applied as in the case in which a sub-tenant server 144 sends lease 150 to client 146 after having received an upper lease 154 from a tenant server 40, as will be perceived by the person having ordinary skill in the art upon reading this Disclosure.

As an additional example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of providing access to storage of a central entity, the method comprising:

at a computing device of the central entity, sharing a secret with a tenant server of a tenant organization of a plurality of tenant organizations, the tenant server being configured to provide authentication services for accessing the storage at the central entity, the central entity being remote from the tenant server;

at the computing device of the central entity, receiving a storage request from an end client device, the end client device being remote from the central entity;

at the computing device of the central entity, extracting an identification of the tenant organization from a core portion of the storage request, the core portion including the identification of the tenant and inner lease terms identifying an inner lease between the tenant organization and a client of the tenant organization;

at the computing device of the central entity, selecting the shared secret of the tenant organization identified by the extracted identification of the tenant organization;

at the computing device of the central entity, cryptographically combining the core portion and the selected shared secret to generate a preliminary test signature;

at the computing device of the central entity, performing a computation using the preliminary test signature and a body portion of the storage request to generate a final test signature, the body portion including the core portion and an object identifier;

at the computing device of the central entity, comparing the final test signature with a signature from the storage request; and at the computing device of the central entity, selectively permitting the end client device to access an object identified by the object identifier depending on a result of a selection operation, the selection operation indicating a lack of permission when the comparison is negative and the selection operation indicating permission only when the comparison is positive.

2. The method of claim 1 wherein performing the computation using the preliminary test signature and the body portion of the storage request includes cryptographically combining the body portion and the preliminary test signature, thereby generating the final test signature.

3. The method of claim 1 wherein:
   the client is the sub-tenant organization;
   the body portion includes the core portion within an outer core portion, the outer core portion including the core portion, an identification of a sub-tenant organization, and outer lease terms identifying an outer lease between the end client device and the sub-tenant organization; and performing the computation using the preliminary test signature and the body portion of the storage request includes:
cryptographically combining the outer core portion and the preliminary test signature, thereby generating an intermediate test signature; and
cryptographically combining the body portion and the intermediate test signature, thereby generating the final test signature.

4. The method of claim 3 wherein:
the tenant organization is authorized to provide the authentication services for accessing only a first portion of the storage at the central entity, the first portion of the storage being smaller than the storage at the central entity;
the sub-tenant organization is authorized to provide authentication services for accessing only a second portion of the first portion of the storage at the central entity, the second portion being smaller than the first portion;
the object has a location within the storage at the central entity;
the storage request complies with the inner lease terms and the outer lease terms only when the location falls within the second portion of the first portion of the storage at the central entity; and
the selection operation indicates a lack of permission when the storage request does not comply with the inner lease terms and the outer lease terms and the selection operation indicates permission only when the storage request complies with the inner lease terms and the outer lease terms.

5. The method of claim 1 wherein:
the client is the end client device;
the tenant organization is authorized to provide the authentication services for accessing only a portion of the storage at the central entity, the portion of the storage being smaller than the storage at the central entity;
the object has a location within the storage at the central entity;
the storage request complies with the inner lease terms only when the location falls within the portion of the storage at the central entity; and
the selection operation indicates a lack of permission when the storage request does not comply with the inner lease terms and the selection operation indicates permission only when the storage request complies with the inner lease terms.

6. The method of claim 5 wherein:
the inner lease terms include an identification of a sub-portion of the portion of the storage at the central entity which the end client device is permitted to access, the sub-portion being smaller than the portion; and
the storage request complies with the inner lease terms only when the location falls within the sub-portion.

7. The method of claim 5 wherein:
the inner lease terms include a time period definition defining a time period during which the end client device is permitted to access the storage at the central entity; and
the storage request complies with the inner lease terms only when a current time falls within the time period defined by the time period definition.

8. An apparatus comprising:
network interface circuitry for communicating with a remote end client device and a plurality of remote tenant servers of respective tenant organizations over a network;
persistent storage; and
processing circuitry coupled to memory configured to:
share a secret with a tenant server of a tenant organization of the plurality of tenant organizations, the tenant server being configured to provide authentication services for accessing the persistent storage;
receive a storage request from the end client device;
extract an identification of the tenant organization from a core portion of the storage request, the core portion including the identification of the tenant and inner lease terms identifying an inner lease between the tenant organization and a client of the tenant organization;
select the shared secret of the tenant organization identified by the extracted identification of the tenant organization;
cryptographically combine the core portion and the selected shared secret to generate a preliminary test signature;
perform a computation using the preliminary test signature and a body portion of the storage request to generate a final test signature, the body portion including the core portion and an object identifier;
compare the final test signature with a signature from the storage request; and
selectively permit the end client device to access an object identified by the object identifier depending on a result of a selection operation, the selection operation indicating a lack of permission when the comparison is negative and the selection operation indicating permission only when the comparison is positive.

9. The apparatus of claim 8 wherein performing the computation using the preliminary test signature and the body portion of the storage request includes cryptographically combining the body portion and the preliminary test signature, thereby generating the final test signature.

10. The apparatus of claim 8 wherein:
the client is the sub-tenant organization;
the body portion includes the core portion within an outer core portion, the outer core portion including the core portion, an identification of a sub-tenant organization, and outer lease terms identifying an outer lease between the end client device and the sub-tenant organization; and
performing the computation using the preliminary test signature and the body portion of the storage request includes:
cryptographically combining the outer core portion and the preliminary test signature, thereby generating an intermediate test signature; and
cryptographically combining the body portion and the intermediate test signature, thereby generating the final test signature.

11. The apparatus of claim 10 wherein:
the tenant organization is authorized to provide the authentication services for accessing only a first portion of the persistent storage, the first portion being smaller than the persistent storage;
the sub-tenant organization is authorized to provide authentication services for accessing only a second portion of the first portion of the persistent storage, the second portion being smaller than the first portion;
the object has a location within the persistent storage;
the storage request complies with the inner lease terms and the outer lease terms only when the location falls within the second portion; and
the selection operation indicates a lack of permission when the storage request does not comply with the inner lease terms and the outer lease terms and the selection operation indicates permission only when the storage request complies with the inner lease terms and the outer lease terms.

12. The apparatus of claim 8 wherein:
the other entity is the end client device;
the tenant organization is authorized to provide the authentication services for accessing only a portion of the persistent storage, the portion being smaller than the persistent storage;
the object has a location within the persistent storage;
the storage request complies with the inner lease terms only when the location falls within the portion of the persistent storage; and
the selection operation indicates a lack of permission when the storage request does not comply with the inner lease terms and the selection operation indicates permission only when the storage request complies with the inner lease terms.

13. The apparatus of claim 12 wherein:
the inner lease terms include an identification of a sub-portion of the portion of the persistent storage which the end client device is permitted to access, the sub-portion being smaller than the portion; and
the storage request complies with the inner lease terms only when the location falls within the sub-portion.

14. The apparatus of claim 12 wherein:
the inner lease terms include a time period definition defining a time period during which the end client device is permitted to access the persistent storage; and
the storage request complies with the inner lease terms only when a current time falls within the time period defined by the time period definition.

15. A computer program product comprising a non-transitory computer-readable storage medium storing instructions, which, when executed by a computing device, cause the computing device to perform the following operations:
sharing a secret with a tenant server of a tenant organization of a plurality of tenant organizations, the tenant server being configured to provide authentication services for accessing persistent storage at the computing device, the computing device being remote from the tenant server;
receiving a storage request from an end client device, the end client device being remote from the computing device;
extracting an identification of the tenant organization from a core portion of the storage request, the core portion including the identification of the tenant and lease terms identifying an inner lease between the tenant organization and a client of the tenant organization;
selecting the shared secret of the tenant organization identified by the extracted identification of the tenant organization;
cryptographically combining the core portion and the selected shared secret to generate a preliminary test signature;
performing a computation using the preliminary test signature and a body portion of the storage request to generate a final test signature, the body portion including the core portion and an object identifier;
comparing the final test signature with a signature from the storage request; and
selectively permitting the end client device to access an object identified by the object identifier depending on a result of a selection operation, the selection operation indicating a lack of permission when the comparison is negative and the selection operation indicating permission only when the comparison is positive.

16. The computer program product of claim 15 wherein performing the computation using the preliminary test signature and the body portion of the storage request includes cryptographically combining the body portion and the preliminary test signature, thereby generating the final test signature.

17. The computer program product of claim 15 wherein:
the client is the sub-tenant organization;
the body portion includes the core portion within an outer core portion, the outer core portion including the core portion, an identification of a sub-tenant organization, and outer lease terms identifying an outer lease between the end client device and the sub-tenant organization; and
performing the computation using the preliminary test signature and the body portion of the storage request includes:
cryptographically combining the outer core portion and the preliminary test signature, thereby generating an intermediate test signature; and
cryptographically combining the body portion and the intermediate test signature, thereby generating the final test signature.

18. The computer program product of claim 17 wherein:
the tenant organization is authorized to provide the authentication services for accessing only a first portion of the persistent storage, the first portion being smaller than the persistent storage;
the sub-tenant organization is authorized to provide authentication services for accessing only a second portion of the first portion of the persistent storage, the second portion being smaller than the first portion;
the object has a location within the persistent storage;
the storage request complies with the inner lease terms and the outer lease terms only when the location falls within the second portion; and
the selection operation indicates a lack of permission when the storage request does not comply with the inner lease terms and the outer lease terms and the selection operation indicates permission only when the storage request complies with the inner lease terms and the outer lease terms.

19. The computer program product of claim 15 wherein:
the other entity is the end client device;
the tenant organization is authorized to provide the authentication services for accessing only a portion of the persistent storage, the portion being smaller than the persistent storage;
the object has a location within the persistent storage;
the storage request complies with the inner lease terms only when the location falls within the portion of the persistent storage; and
the selection operation indicates a lack of permission when the storage request does not comply with the inner lease terms and the selection operation indicates permission only when the storage request complies with the inner lease terms.

20. The computer program product of claim 19 wherein:

the inner lease terms include an identification of a sub-portion of the portion of the persistent storage which the end client device is permitted to access, the sub-portion being smaller than the portion; and the storage request complies with the inner lease terms only when the location falls within the sub-portion.

* * * * *